(12) United States Patent
Bellwood et al.

(10) Patent No.: US 8,571,209 B2
(45) Date of Patent: Oct. 29, 2013

(54) RECORDING KEYS IN A BROADCAST-ENCRYPTION-BASED SYSTEM

(75) Inventors: Thomas Alexander Bellwood, Austin, TX (US); Robert Glenn Deen, San Jose, CA (US); Hongxia Jin, San Jose, CA (US); Jeffrey Bruce Lotspiech, Henderson, NV (US); Sigfredo Ismael Nin, Morgan Hill, CA (US); Matthew Francis Rutkowski, Pflugerville, TX (US)

(73) Assignee: International Business Machines, Armonk, NY (US)

( * ) Notice: Subject to any disclaimer, the term of this patent is extended or adjusted under 35 U.S.C. 154(b) by 1320 days.

(21) Appl. No.: 12/356,067

(22) Filed: Jan. 19, 2009

(65) Prior Publication Data

US 2010/0183148 A1 Jul. 22, 2010

(51) Int. Cl.
 *H04L 9/06* (2006.01)
(52) U.S. Cl.
 USPC ............... 380/44; 380/28; 380/277; 380/278; 380/281; 726/2; 726/26; 726/27
(58) Field of Classification Search
 USPC ............. 380/44, 277, 278, 281; 726/2, 26, 27
 See application file for complete search history.

(56) References Cited

U.S. PATENT DOCUMENTS

| | | |
|---|---|---|
| 4,041,249 A | 8/1977 | Matz et al. |
| 4,634,807 A | 1/1987 | Chorley et al. |
| 4,694,491 A | 9/1987 | Horne et al. |
| 4,864,616 A | 9/1989 | Pond et al. |
| 5,058,162 A | 10/1991 | Santon et al. |
| 5,065,429 A | 11/1991 | Lang |
| 5,081,677 A | 1/1992 | Green et al. |
| 5,177,791 A | 1/1993 | Yeh et al. |

(Continued)

FOREIGN PATENT DOCUMENTS

| | | |
|---|---|---|
| JP | 2007-043336 | * 2/2007 |
| WO | WO 99/19822 | 4/1999 |
| WO | WO 00/48190 | 8/2000 |
| WO | WO 01/22406 | 3/2001 |

OTHER PUBLICATIONS

A Technical Overview of Windows Media DRM 10 for Devices, Microsoft Corporation, Sep. 2004, p. 5 paragraphs 1 and 2.*

(Continued)

*Primary Examiner* — Saleh Najjar
*Assistant Examiner* — Joseph Pan
(74) *Attorney, Agent, or Firm* — Donald L. Wenskay; Mohammed Kashef

(57) ABSTRACT

Embodiments of the invention relate to obtaining forensic information for an anonymous attack of digital content without variations in a broadcast encryption system. In one embodiment a media device, being configured to record digital content on recordable media, receives digital content, a unified media key block, and a recording key table. The device calculates a set of recording keys from the recording key table using a media key variant from the unified media key block. The device then generates a title key and encrypts by the digital content in the generated title key. The device then encrypts the generated title key in each one of the calculated recording keys, adds a header including the encrypted titles keys to the encrypted digital content, and stores the encrypted digital content with the header on recordable media.

15 Claims, 6 Drawing Sheets

(56) References Cited

U.S. PATENT DOCUMENTS

| | | |
|---|---|---|
| 5,247,497 A | 9/1993 | Cohn |
| 5,272,752 A | 12/1993 | Myers et al. |
| 5,345,505 A | 9/1994 | Pires |
| 5,412,723 A | 5/1995 | Canetti et al. |
| 5,592,552 A | 1/1997 | Fiat |
| 5,598,470 A | 1/1997 | Cooper et al. |
| 5,636,276 A | 6/1997 | Brugger |
| 5,651,064 A | 7/1997 | Newell |
| 5,668,873 A | 9/1997 | Yamauchi |
| 5,680,457 A | 10/1997 | Bestler et al. |
| 5,708,632 A | 1/1998 | Totsuka et al. |
| 5,734,719 A | 3/1998 | Tsevdos et al. |
| 5,754,648 A | 5/1998 | Ryan et al. |
| 5,754,649 A | 5/1998 | Ryan et al. |
| 5,796,824 A | 8/1998 | Hasebe et al. |
| 5,910,987 A | 6/1999 | Ginter et al. |
| 5,949,885 A | 9/1999 | Leighton |
| 6,020,883 A | 2/2000 | Herz et al. |
| 6,061,451 A | 5/2000 | Muratani et al. |
| 6,064,072 A | 5/2000 | Partlo et al. |
| 6,118,873 A | 9/2000 | Lotspiech |
| 6,134,201 A | 10/2000 | Sako et al. |
| 6,209,092 B1 | 3/2001 | Linnartz |
| 6,285,774 B1 | 9/2001 | Schumann et al. |
| 6,289,455 B1 | 9/2001 | Kocher et al. |
| 6,347,846 B1 | 2/2002 | Nakamura |
| 6,370,272 B1 | 4/2002 | Shimizu |
| 6,381,367 B1 | 4/2002 | Ryan |
| 6,434,535 B1 | 8/2002 | Kupka et al. |
| 6,442,108 B1 | 8/2002 | Kurihara et al. |
| 6,442,626 B1 | 8/2002 | Smola et al. |
| 6,535,858 B1 | 3/2003 | Blaukovitsch et al. |
| 6,556,679 B1 | 4/2003 | Kato et al. |
| 6,563,937 B1 | 5/2003 | Wendt |
| 6,587,949 B1 | 7/2003 | Steinberg |
| 6,609,116 B1 | 8/2003 | Lotspiech |
| 6,636,966 B1 | 10/2003 | Lee et al. |
| 6,738,878 B2 | 5/2004 | Ripley et al. |
| 6,760,445 B1 | 7/2004 | Schwenk et al. |
| 6,760,539 B2 | 7/2004 | Asada et al. |
| 6,775,779 B1 | 8/2004 | England et al. |
| 6,802,003 B1 | 10/2004 | Gross et al. |
| 6,832,319 B1 | 12/2004 | Bell et al. |
| 6,839,436 B1 | 1/2005 | Garay et al. |
| 6,856,997 B2 | 2/2005 | Lee et al. |
| 6,857,076 B1 | 2/2005 | Klein |
| 6,888,944 B2 | 5/2005 | Lotspiech et al. |
| 6,901,548 B2 | 5/2005 | Hattori et al. |
| 6,912,634 B2 | 6/2005 | Ripley et al. |
| 6,947,563 B2 | 9/2005 | Fagin et al. |
| 6,999,947 B2 | 2/2006 | Utsumi et al. |
| 7,010,125 B2 | 3/2006 | Lotspiech et al. |
| 7,036,024 B2 | 4/2006 | Watson |
| 7,039,803 B2 | 5/2006 | Lotspiech et al. |
| 7,046,808 B1 | 5/2006 | Metois et al. |
| 7,057,993 B2 | 6/2006 | Barnard et al. |
| 7,082,537 B2 | 7/2006 | Muratani |
| 7,083,132 B2 | 8/2006 | Irwin et al. |
| 7,120,901 B2 | 10/2006 | Ferri et al. |
| 7,155,591 B2 | 12/2006 | Ripley et al. |
| 7,162,646 B2 | 1/2007 | Wu et al. |
| 7,215,629 B2 | 5/2007 | Eppler |
| 7,283,633 B2 | 10/2007 | Asano et al. |
| 7,296,159 B2 | 11/2007 | Zhang et al. |
| 7,305,711 B2 | 12/2007 | Ellison et al. |
| 7,319,752 B2 | 1/2008 | Asano et al. |
| 7,346,169 B2 | 3/2008 | Asano et al. |
| 7,380,132 B2 | 5/2008 | Sako et al. |
| 7,380,137 B2 | 5/2008 | Bell et al. |
| 7,392,392 B2 | 6/2008 | Levy |
| 2002/0003881 A1 | 1/2002 | Reitmeier et al. |
| 2002/0044320 A1 | 4/2002 | Pfeiffer et al. |
| 2002/0104001 A1 | 8/2002 | Lotspiech et al. |
| 2002/0141582 A1 | 10/2002 | Kocher et al. |
| 2003/0070083 A1 | 4/2003 | Nessler |
| 2003/0142826 A1* | 7/2003 | Asano ........................... 380/277 |
| 2003/0169885 A1 | 9/2003 | Rinaldi |
| 2003/0220921 A1 | 11/2003 | Fagin et al. |
| 2004/0034787 A1 | 2/2004 | Kitani |
| 2004/0098593 A1 | 5/2004 | Muratani |
| 2004/0111611 A1 | 6/2004 | Jin et al. |
| 2004/0128259 A1 | 7/2004 | Blakeley et al. |
| 2004/0133794 A1 | 7/2004 | Kochner et al. |
| 2004/0153941 A1 | 8/2004 | Muratani |
| 2004/0172549 A1* | 9/2004 | Kojima et al. ................. 713/193 |
| 2005/0021568 A1 | 1/2005 | Pelly |
| 2005/0097110 A1 | 5/2005 | Nishanov et al. |
| 2005/0141704 A1 | 6/2005 | Van Der Veen |
| 2005/0283610 A1 | 12/2005 | Serret-Avila et al. |
| 2006/0056695 A1 | 3/2006 | Wu et al. |
| 2006/0085343 A1 | 4/2006 | Lisanke et al. |
| 2006/0136728 A1 | 6/2006 | Gentry et al. |
| 2006/0239503 A1 | 10/2006 | Petrovic et al. |
| 2006/0282676 A1 | 12/2006 | Serret-Avila et al. |
| 2007/0025694 A1* | 2/2007 | Takashima et al. ............. 386/95 |
| 2007/0067242 A1 | 3/2007 | Lotspiech et al. |
| 2007/0067244 A1 | 3/2007 | Jin et al. |
| 2007/0165853 A1 | 7/2007 | Jin et al. |
| 2007/0174637 A1 | 7/2007 | Lotspiech et al. |
| 2008/0199007 A1* | 8/2008 | Candelore ....................... 380/201 |
| 2009/0193262 A1* | 7/2009 | Sweazey ........................ 713/182 |
| 2009/0214031 A1* | 8/2009 | Jin et al. ......................... 380/200 |
| 2010/0043081 A1* | 2/2010 | Kiayias et al. .................. 726/30 |

OTHER PUBLICATIONS

Boneh et al., "Fully collusion resistant traitor tracing with short cipher texts and private keys," Eurocrypt '06, 2006, http://citeseer.ist.psu.edu/boneh06fully.html.

Celik et al., "Collusion-resilient fingerprinting using random prewarping," Image Processing, 2003, ICIP 2003, Proceedings, 2003 International Conference vol. 1, 14-17 Sep. 2003 pp. 1-509-12, vol. 1.

Deguillaume et al., "Countermeasures for unintentional and intentional video watermarking attacks," Conference SPIE—Int. Soc. Opt. Eng. (USA), Jan. 24-26, 2000, vol. 3971, p. 346-357.

Fernandez-Munoz et al., "Fingerprinting schemes for the protection of multimedia distribution rights," Upgrade, Security in e-Commerce, v. III, n.6, pp. 36-40, Dec. 2002, http://www.cepis-upgrade.org/issues/2002/6/upqrade-vIII-6.pdf.

Hagiwara et al., "A short random fingerprinting code against a small number of pirates" Applied Algebra, Algebraic Algorithms and Error-Correcting Codes, 16$^{th}$ International Symposium, AAEECC-16. Proceedings (Lecture Notes in Computer Science vol. 3857) pp. 193-202 (Feb. 2-24, 2006).

Kocher et al., "Self-protecting digital content," Technical Report from the CRI Content Security Research Initiative, Cryptography Research, Inc. (CRI), 2002-2003, http://www.cryptography.com/resources/whitepapers/SelfProtectingContent.pdf.

Pfitzmann et al., "Trials of traced traitors," (c) 1996 Workshop on Information Hiding, pp. 1-14.

Seol et al., "A scalable fingerprinting scheme for tracing traitors/colluders in large scale contents distribution environments," Intelligent Systems Design and Applications, 2005. ISDA 2005, Proceedings, 5$^{th}$ International Conference Sep. 8-10, 2005 pp. 228-233.

Silverberg et al., "Application of list decoding to tracing traitors," a version of this paper appeared in ASIACRYPT 2001, 2001, http://www.math.unl.edu/-jwalker/papers/taipp.pdf.

Tardos G., "Optimal probabilistic fingerprint codes," Proceedings of the 35$^{th}$ Annual ACM Symposium on Theory Computing, 2003, pp. 116-125.

Zhu et al., "Analysis on AACS traitor tracing against mix-and-match attacks," IEEE CCNC 2008, p. 1097.

U.S. Appl. No. 12/131,073, filed May 31, 2008, Bellwood et al.
U.S. Appl. No. 12/131,074, filed May 31, 2008, Lotspiech.
U.S. Appl. No. 12/131,076, filed May 31, 2008, Jin et al.
U.S. Appl. No. 12/143,061, filed Jun. 20, 2008, Jin et al.
U.S. Appl. No. 12/143,658, filed Jun. 20, 2008, Jin et al.
U.S. Appl. No. 12/192,962, filed Aug. 15, 2008, Jin et al.
Lotspiech et al., System, Method, and Service for Performing Unified Broadcast Encryption and Traitor Tracing for Digital Content.

* cited by examiner

24

Recording Key Table

| Media Key Variants | Recording Keys | | | | |
|---|---|---|---|---|---|
| Variant 1 | $K_{r11}$ | $K_{r12}$ | $K_{r13}$ | ... | $K_{r1n}$ |
| Variant 2 | $K_{r21}$ | $K_{r22}$ | $K_{r23}$ | ... | $K_{r2n}$ |
| Variant 3 | $K_{r31}$ | $K_{r32}$ | $K_{r33}$ | ... | $K_{r3n}$ |
| ⋮ | | | | | |
| Variant m | $K_{rm1}$ | $K_{rm2}$ | $K_{rm3}$ | | $K_{rmn}$ |

*FIG. 5*

RECORDING KEYS IN A BROADCAST-ENCRYPTION-BASED SYSTEM

BACKGROUND

The present invention relates to content protection, and more specifically, to recording keys in broadcast encryption systems.

The rapid rise in illegal copying of digital entertainment content has necessitated increasingly sophisticated content protection systems. Broadcast encryption cryptography is one content protection approach that has become very popular in recent years because it is especially well suited for content protection systems. Broadcast encryption is essential to provide secure key management on physical media. For example, the Content Protection for Recordable Media (CPRM) system has been developed to protect content on DVD recordable discs and on Secure Digital (SD) flash memory cards. More recently, the Advanced Access Content System (AACS) has been developed to protect content on high-definition blue-laser DVDs. Both CPRM and AACS are fundamentally based on broadcast encryption.

There is a certain type of attack that broadcast-encryption-based systems are susceptible to. This attack is called the anonymous attack. In this attack, the attackers steal one or more sets of device keys. With these sets of device keys, the attackers are able to make unauthorized copies of the content. Rather than putting those device keys into a circumvention device and selling it as a copying device, however, the attackers may put the keys in a server and offer a copying service instead of a copying device. Whether the attackers are selling a copying device, or offering a copying service, it is the goal of the licensing agency to determine precisely which sets of keys the attackers are using, so that they can be revoked on new content.

However, this determination is substantially harder in the case of an anonymous attack than it is in the case of a circumvention device. In the case of the circumvention device, the licensing agency can bring the device into the lab and test it by giving it a series of special forensic media key blocks (MKBs), which are designed so that only a fraction of the devices in the world can calculate the right key. In the anonymous attack, forensic MKBs cannot be used; the MKBs must be production MKBs: all devices can use them.

To combat anonymous attacks, the AACS system has a special forensic feature: in addition to the media key, which fundamentally protects the DVD, and which all devices can calculate, there are 1024 media key variants. The idea is that the content (such as a digital movie) is authored so that at certain points in the movie, there are logically identical but differently encrypted variations. A given device can calculate only one media key variant, and therefore play only one of the variations. Likewise, the anonymous attack server must reveal at least one media key variant when it decrypts the content. (Of course, the server, unlike a licensed device, could have more than one variant, because it might be comprised of keys from more than one device). Nonetheless, by carefully observing the sequence of variations the server picks, the licensing agency can determine which sets of device keys the server must have. This process is commonly called tracing traitors.

SUMMARY

According to one embodiment of the present invention, a method comprises: receiving digital content, a media key block, and a recording key table in a recording device; generating a set of recording keys from the recording key table using a media key variant from the media key block; generating a title key; encrypting the digital content in the generated title key; and encrypting the selected title key in each one of the generated recording keys.

According to another embodiment of the present invention, a method comprises: receiving recorded digital content having been recorded by encrypting the content in a title key and having a header including the title key encrypted in a plurality of recording keys; modifying the header such that it contains different title keys encrypted by different recording keys; sending the digital content with the modified header to a copying service; receiving a copied version of the digital content from the copying service; and performing traitor tracing on the received copied version to determine which of a plurality of known media key variants the server possesses.

According to a further embodiment of the present invention, a system comprises: a recording device for generating and outputting a recording of digital content, the recording device being able to calculate media key variant from a media key block, a recording key processor, and an encryption processor; a set of recording keys generated by the recording key processor from a recording key table and the media key variant; a single title key generated by the recording key processor; and an encryption processor for encrypting the digital content in the generated title key, the encryption processor encrypting the generated title key in every one of the recording keys.

According to another embodiment of the present invention, a computer program product for broadcast encryption comprises: a computer usable medium having computer usable program code embodied therewith, the computer usable program code comprising: computer usable program code configured to: receive digital content, a media key block, and a recording key table in a recording device; generate a set of recording keys from the recording key table using a media key variant from the media key block; generate a title key; encrypt the digital content in the generated title key; and encrypt the generated title key in each one of the generated recording keys.

BRIEF DESCRIPTION OF THE SEVERAL VIEWS OF THE DRAWINGS

FIG. 5 shows recording key table used in various embodiments of the invention.

DETAILED DESCRIPTION

Figure 1:
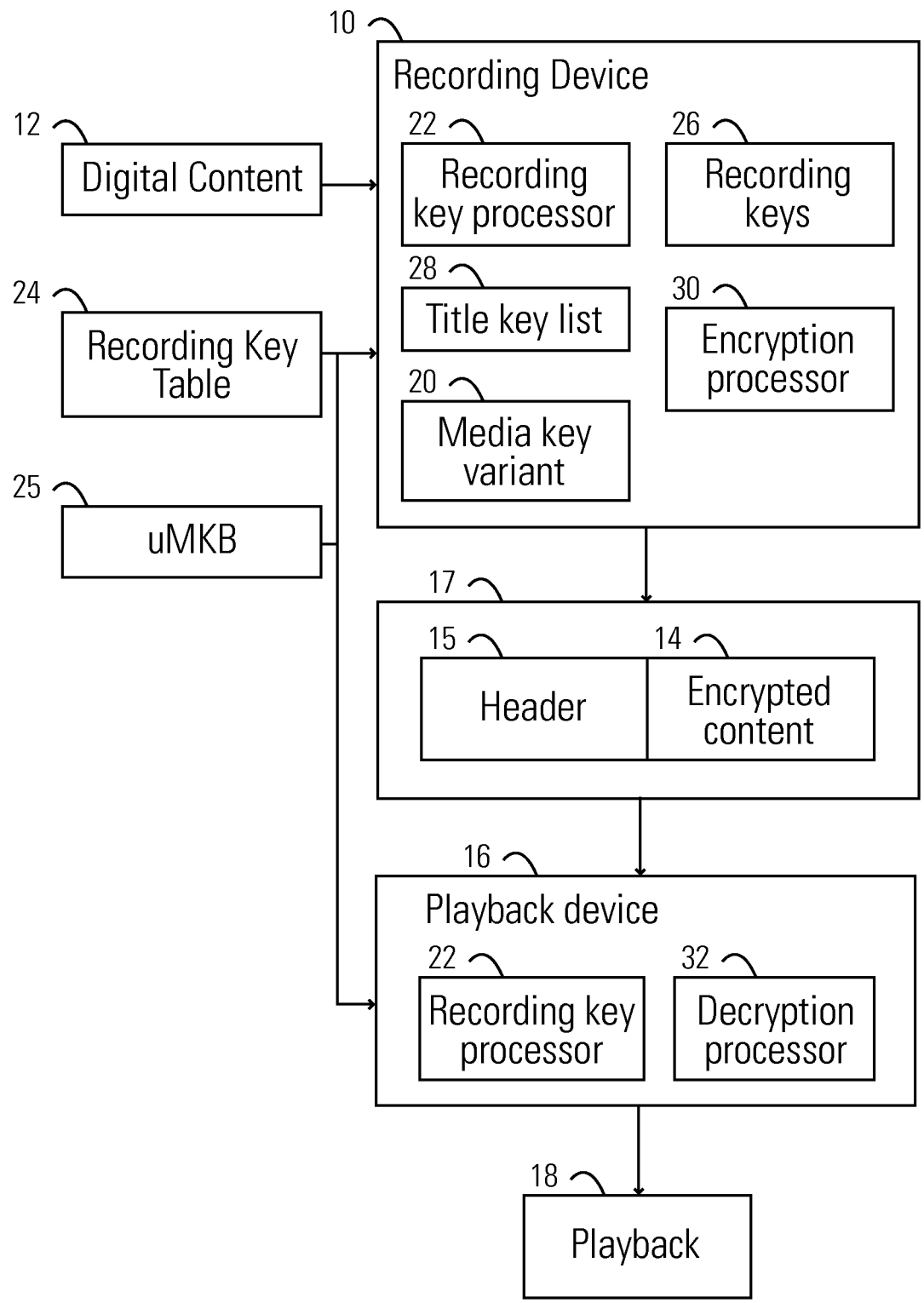
FIG. 1 shows a diagram of a broadcast encryption system in accordance with an embodiment of the invention.

Embodiments of the invention provide a broadcast encryption system which includes a method to make a recording, so that even content without variations can be used to obtain useful forensic information against an anonymous attack.

AACS has a separate set of keys, called sequence keys, for its tracing traitors system. The tracing traitors technology works well for prepared content, which can be deliberately authored with multiple variations. However, it does not work at all when the content does not have variations. With some content types, it is especially difficult to prepare the content with variations. For example, a copy-protected recording of a TV program off the air will not have variations. Thus, most of the applications of the CPRM system could not take advantage of this type of forensics, and tracing traitors technology is absent in the CPRM system.

In embodiments of the present invention, recording devices use its media key variant to calculate a set of recording keys. Each media key variant potentially creates a unique set of recording keys; however, in normal operation, all such sets are designed so that any two sets have at least one key in common. In normal operation, when a device makes a protected recording, it picks a random key, called a title key, and encrypts the content in that title key. It then encrypts that title key in every one of the recording keys it knows and records these encryptions in a header for the recording. Later when a different device wants to play back the recording, it searches through the list of encrypted title keys in the header until it finds one it can decrypt (there will always be at least one, because any two proper recording key sets must have at least one key in common), and then it has the title key to decrypt and play back the recording. To facilitate the playing device's search, the header contains the labels of the recording keys used, and the devices know the labels of its recording keys. This is how the system works in normal operation.

In a forensic situation, however, the licensing agency can modify a header so that different recording keys encrypt different title keys. Also, the rule for normal operation that any two devices are guaranteed to have at least one key in common may be abandoned during the forensic situation. The agency observes which title key the attacker's server returns, which tells the agency one of the recording keys that server has. In the simplest scenario, the attacker's servers return title keys in the clear to the user, who then uses his own decryption program to get the content in the clear. Of course, the attackers can be more subtle: the attackers could have their own decryption client, difficult to reverse-engineer, and deliver the title keys to this client in an obfuscated way. However, this improved attack scenario does not present any insurmountable obstacles to the licensing agency. The licensing agency can always look at the "decrypted" content from this client and deduce which title key(s) must have been used, even if the decryption itself is meaningless data.

In any case, after multiple tests, using a standard tracing traitors approach, the agency can determine which media key variant or variants the server has. Then, again using a standard tracing traitors approach, the agency uses the variants from multiple tests to determine precisely which device keys the server must have. Then, the keys can be revoked, and the attack foiled.

Note that recording keys require a two-stage process to trace to the individual device keys, whereas if there were variations in the content itself, the tracing can usually be done in one stage: the media key variant or variants can usually be deduced directly from the variations in the content. However, the recording keys work regardless of whether the content has variations; in effect, the keys themselves provide pseudo-variations that give the forensics to combat the attack.

Referring now to FIG. 1 there is shown a block diagram of an exemplary overall environment in which a system, a service, a computer program product, and an associated method for performing broadcast encryption and traitor tracing for digital content according to an embodiment of the present invention may be used. A recording device 10 receives digital content 12 and generates an output file 17 containing an encrypted version of the digital content 14 and a header 15. A playback device 16 decrypts the encrypted content 14 and generates an output 18 that may be viewed or utilized by a user.

In more detail, both the recording device 10 and the playback device 16 have access to a recording key table 24 and a unified media key block 25, called hereafter the "uMKB" 25. The recording key table 24 and the uMKB 25 are files that may be associated with the digital content 12, or they may be held in common amongst many pieces of content. For example, these files may be part of a content protection system on a home entertainment network. Also, these two files might be combined in a single file. The recording key table 24 is described in more detail below and is also shown in FIG. 5. By uMKB, we mean the media key block for performing broadcast encryption as disclosed in U.S. patent application Ser. No. 11/746,491, entitled "System, Method, and Service for Performing Unified Broadcast Encryption and Traitor Tracing for Digital Content", the contents of which are incorporated herein by reference. The characteristic of an uMKB is that devices use the uMKB to calculate both a common media key and a non-common media key variant; different groups of devices calculate different media key variants for forensic reasons. Those skilled in the art will appreciate that the uMKB could be split into multiple blocks, as is done with AACS (which has both media key blocks and sequence key blocks which together accomplish the same function) while still remaining within the scope of the present invention Recording device 10 calculates a media key variant 20 from the uMKB 25 that is associated with the recording device 10, and also generates a title key 28. A recording key processor 22 uses the media key variant 20 as well as the recording key table 24 to calculate a set of recording keys 26. An encryption processor 30 encrypts the digital content 12 using the title key 28. The encryption processor 30 also encrypts the title key 28 in every recording key known to the recording device 10, and includes these encrypted title keys in a header 15 that is added to the encrypted content 14 in the output file 17 produced by the recording device 10.

The encrypted content 14 is played back by a playback device 16, which includes a decryption processor 32 and its own recording key processor 22. The playback device 16 has access to the recording key table 24 and the uMKB 25, allowing it to calculate its own media key variant, and also its own set of recording keys. In general, the playback device's 16 recording key set is not the same set as the recording device 10's recording key set 26. However, the playback device 16 will have at least one recording key in common with the playback device 16. The decryption processor 32 searches through the header 15 in the encrypted content for an encrypted title key that was encrypted with a recording key that playback device 16 has. Thus, the playback device can decrypt the encrypted title key and then use it to decrypt the encrypted digital content 14 and play it back through the playback mechanism 18.

Figure 2:
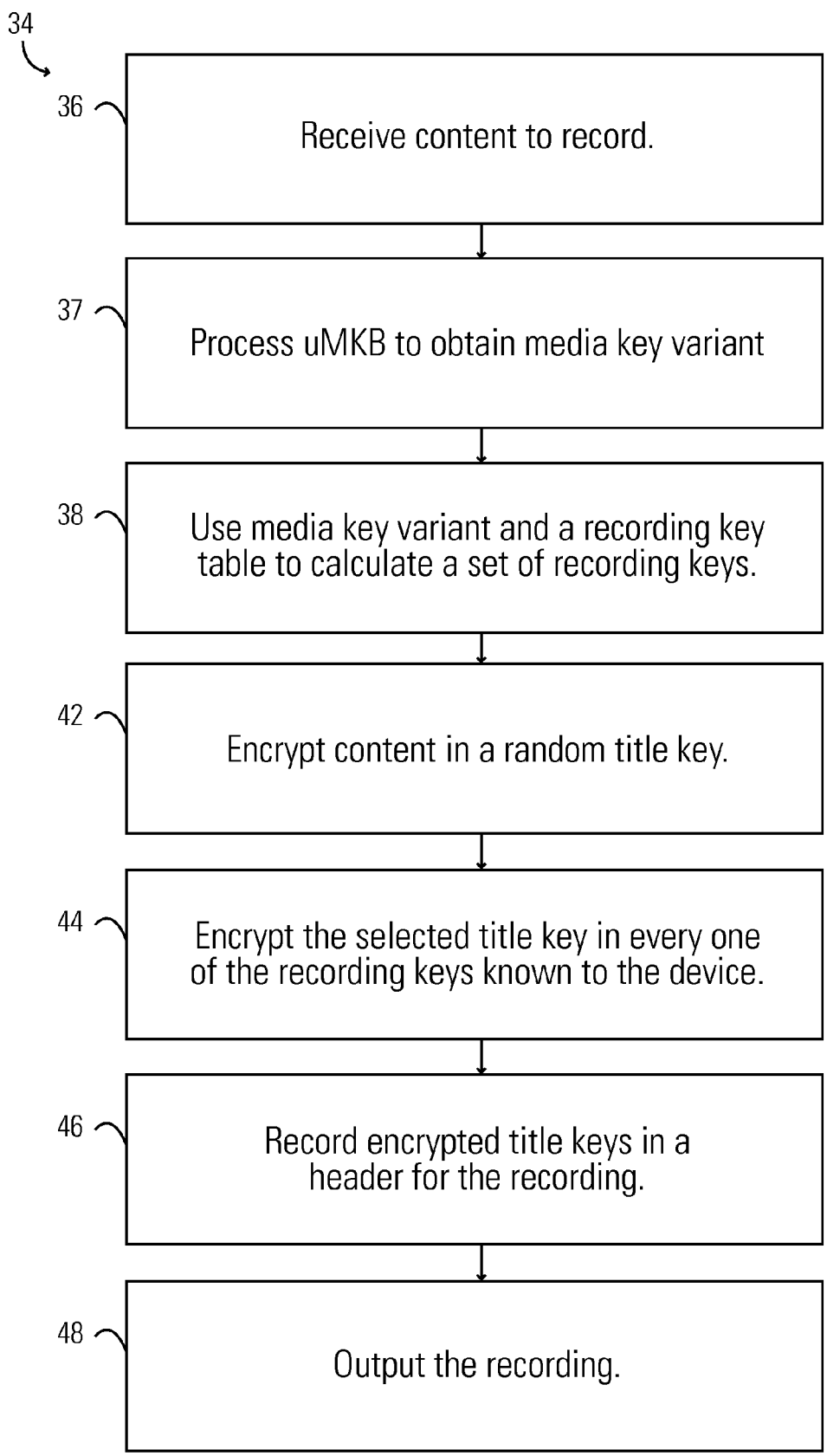
FIG. 2 shows a flowchart of a method for recording digital content in accordance with an embodiment of the invention.

FIG. 2 is a flowchart of a method 34 of recording digital media in accordance with an embodiment of the invention. In step 36, a recording device, such as recording device 10, receives digital content to record. The device also has access to a recording key table and an uMKB. The recording key table is configured such that each group of devices has an associated row, and any two rows have at least one recording key in common. In step 37, the device processes the uMKB to obtain a media key variant. In step 38, the recording device uses the media key variant from step 37 to calculate a set of recording keys. This is done by decrypting each recording key in an associated row in the recording key table, as described in more detail below.

The content is then encrypted in a randomly generated title key, in step 42. In step 44 the title key is encrypted in every one of the recording keys known to the device. These encrypted title keys are then recorded in the header of the recording, in step 46 and the encrypted recording is output in step 48.

Figure 3:
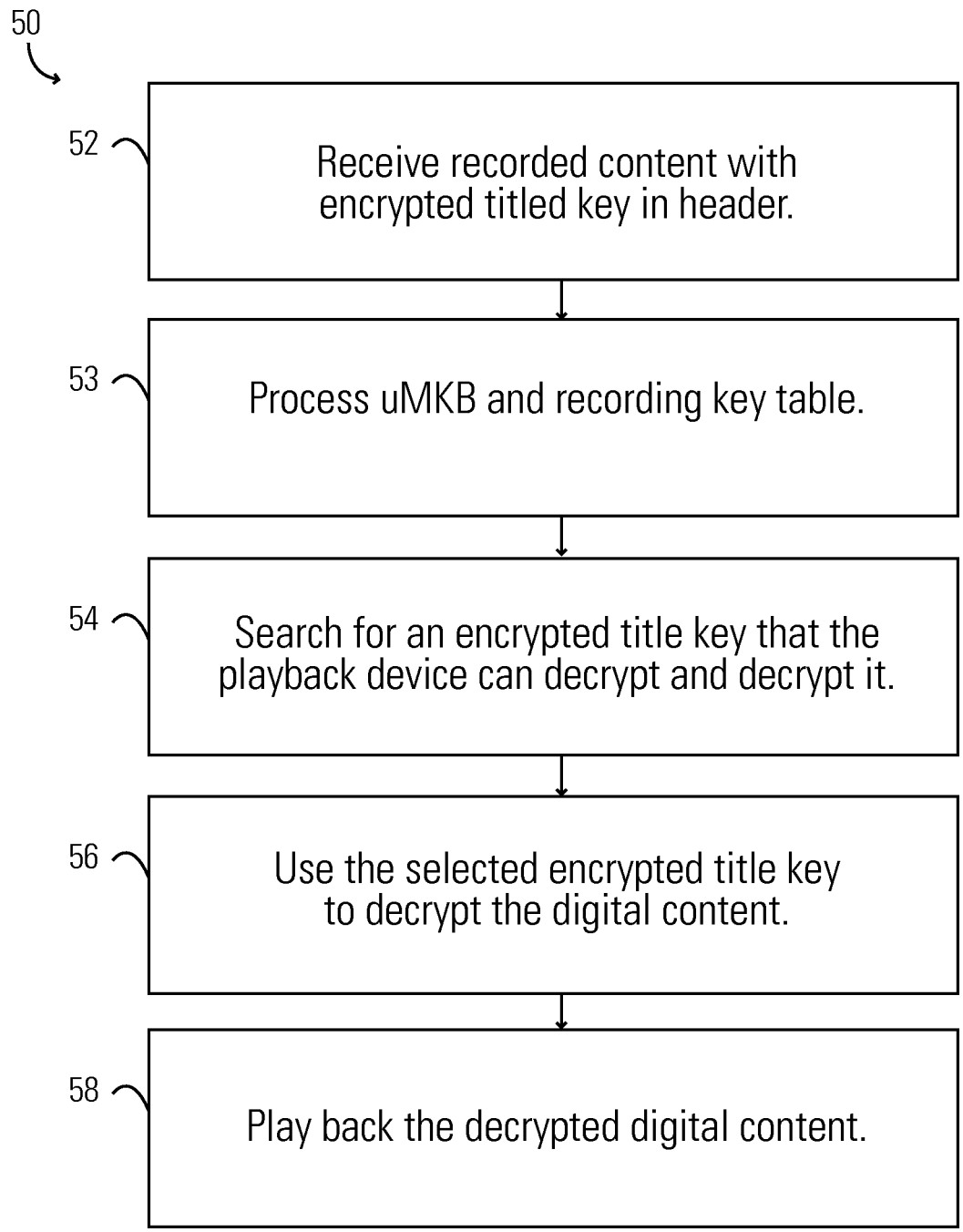
FIG. 3 shows a flowchart of a method for playing back digital content in accordance with an embodiment of the invention.

FIG. 3 is a flowchart of a method 50 for playback of the recording produced by the method 34 shown in FIG. 2. In step 52, encrypted recorded content from the recording device is received in the playback device 16. The playback device has access to the same uMKB and recording key table used during the recording. In step 53, the playback device processes the uMKB to calculate its media key variant, and processes the recording key table to decrypt a set of recording keys. The playback device searches for an encrypted title key that the playback device can decrypt, in step 54. In step 56, the resulting selected title key is then used to decrypt the content, and the content is played back in step 58.

Figure 4:
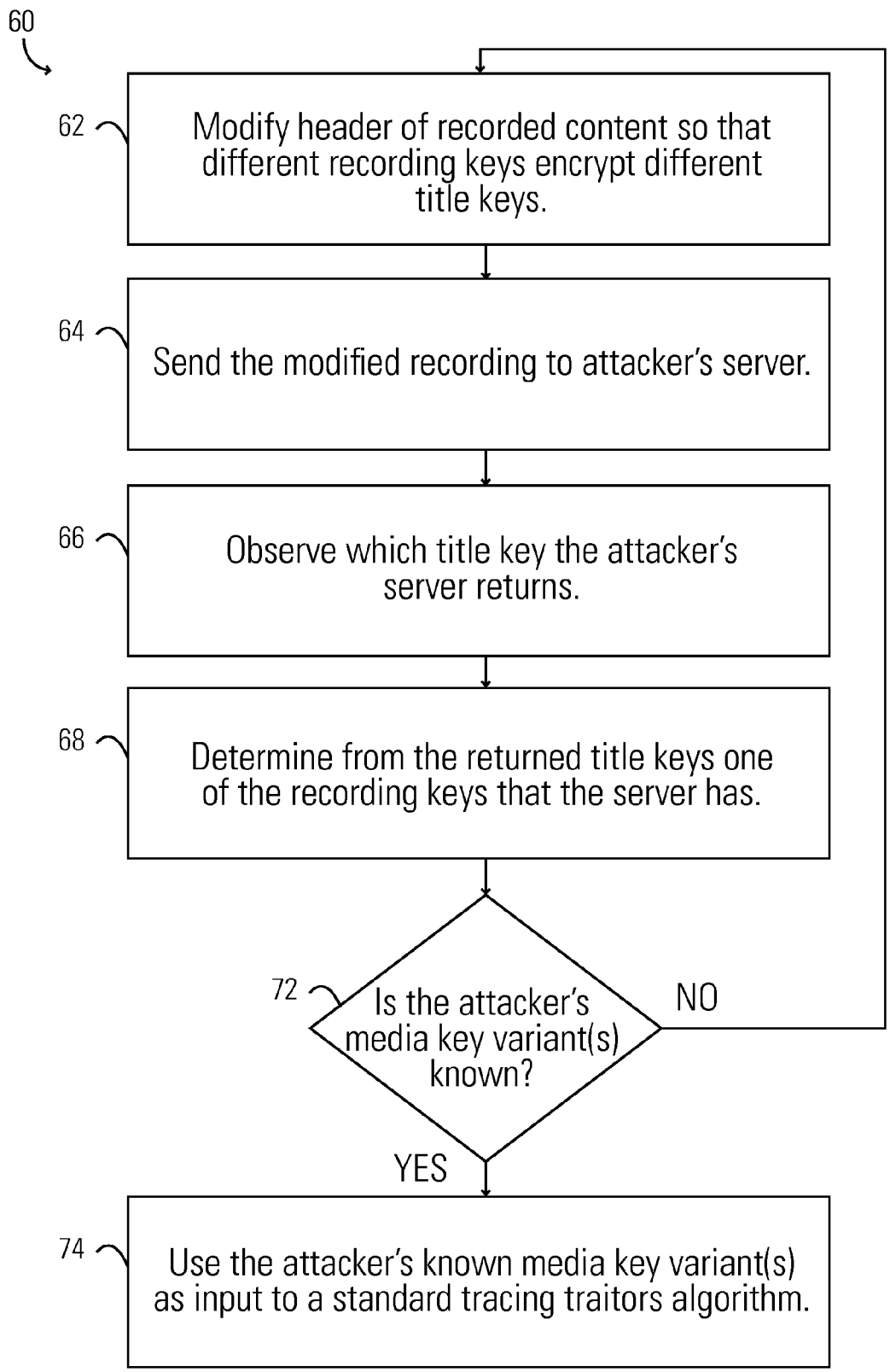
FIG. 4 shows a flowchart of a method for traitor tracing in accordance with an embodiment of the invention.

FIG. 4 shows a flowchart of a method 60 of traitor tracing in accordance with an embodiment of the present invention. In step 62, digital content recorded according to the method 34 shown in FIG. 2 is modified so that different recording keys encrypt different title keys. The content is then sent to an attacker in step 64. The attacker in this case is in the business of making unauthorized copies of copy-protected content for a fee. The returned copy is then analyzed to determine which title key the attacker's server returns in the unauthorized copy, in step 66. In step 68, the recording key associated with that title key is added to a history of known recording keys.

In step 72, the history of known attacker's recording keys is examined using standard tracing traitors techniques to determine if the attacker's media key variant or variants are known yet. If so, the process proceeds to step 74. Otherwise, the process loops and repeats the process at step 62. Note at this point the recording key table is changed, so that new information can be obtained in the new test. How the recording key table is changed depends on the particular tracing traitors method in use. For example, if the history reveals one of sixteen media key variants, then the new recording key table would focus on these variants, making sure that they would have no title keys and hence recording keys in common. (This is the opposite of what happens in normal operation.)

In step 74, the media key variants are input to a conventional traitor tracing algorithm. The purpose of this tracing algorithm is to eventually determine which device or devices have been compromised in building the attacker's server. Then, the devices' keys can be revoked in subsequent uMKBs. However, tracing traitors algorithms rarely can determine the guilty devices in a single step. So, as required by the algorithm, the process 60 usually must be repeated many times before actual revocation can occur.

Referring now to FIG. 5 there is shown an exemplary recording key table, such as recording key table 24 shown in FIG. 1, in accordance with an embodiment of the invention. As noted above, the recording device 10 calculates the recording keys by referring to the recording key table 24. This table may have one row for each media key variant defined in the uMKB. The number of columns is the number of recording keys each device will have. The entries in the table are the recording keys themselves, encrypted with the media key variant for that row. A recording device 10 or a playback device 16 uses its media key variant to index into the table and decrypt that row—this gives the device its set of recording keys.

The licensing agency produces the recording key table. It can be part of the MKB, or it can be a separate file. If it is in a separate file, different recording key tables can be associated with each piece of content. The table must have the property that any two rows in the table have at least one recording key in common. There are well-known techniques to ensure this. If each row is thought of as a "codeword" and each recording key is thought of as a "symbol", ensuring this property is a well-studied problem in coding theory. For example, an "N out of M" code, where each device has N keys out of a total of M keys in the system, is guaranteed to have this property if N>M/2. In addition, a randomly-generated code can be easily fixed to have the desire property. All such encodings are within the scope of this invention.

In one embodiment of the invention, the recording key table contains a label or name for each recording key. These are encrypted in the table just like the keys. Then, when a device records a header by encrypting the title key with each of its recording keys, it also stores the labels of those keys in the clear. Then, another device can process the header more rapidly, by searching for labels for which it knows the recording key. Otherwise, the device would have to perform all the decryptions and determine which decryption yields the valid title key by some other means.

In many applications, it is very convenient if the uMKB and the recording key table are not secret; they are just simple files. However, this opens up an attack: a user can make an unauthorized copy of a piece of content not by decrypting it, but instead by merely copying the uMKB and recording key table along with the encrypted bits. This is a classic problem in content protection, and has a simple solution: the fundamental protection key is not the one that is immediately extracted from the uMKB, but is instead a "bound" version of it. A bound key is a key that has been transformed with an identifier that is unique to the user, and cannot be changed by him. This transformation can be as simple as exclusive-OR-ing the key with the identifier. The transformation guarantees two users will have different content protection keys, even if they happen to have the same uMKB, and therefore cannot make unauthorized copies between themselves simply by sharing encrypted content.

In the interest of simplicity and clarity of explanation, and because the binding transformation is well known in content protection schemes, we have omitted the binding step in FIGS. 1 through 4. It should be understood, however, that the recording key set 26 could be a bound version of the recording keys when creating the header 15, and this would be within the scope of this invention.

There is another similar but more subtle attack that can occur in content protection systems when different content has different privileges. For example, a video recording system might have the rule that unlimited copies of over-the-air terrestrial broadcasts can be made for private use, but that premium pay-per-view broadcasts are not allowed to be copied. Such rules are called "usage rules" in the art. The attack is for the user to substitute more generous usage rules for more strict ones in a piece of content. The simple defense to this attack that is commonly used in content protection schemes is to tie the usage rules to the content's particular title key or keys. A common way to make this tie is to exclusive-OR a cryptographic hash of the usage rules with the title key before the title key is encrypted. Then, if the user modifies the usage rules, the title key calculation will be incorrect, and the content will be useless. Such a transformation of the title key 28 before encrypting it with the recording keys 26 is within the scope of this invention.

Note that if the attacker's server knows multiple recording keys in a given content header, and the recording keys are telling it different title keys, it knows it is under forensic test. Of course, it can refuse to reveal any title keys in that case, but even that refusal reveals information to the licensing agency. It is more troublesome, though, if the server is a subscription service. Then the server, knowing this "subscriber" is, in fact, the licensing agency, would refuse all future service. The licensing agency would have to re-subscribe under a different name, which would undoubtedly cost more money to perform the test.

To solve this problem, in another embodiment of the present invention the content is encrypted with multiple title keys. This does not mean the content has variations—it just means that different parts of the content use different title keys. For example, a video recording could change the title key every minute of video. This would have a negligible impact on the playback, but greatly complicate the job of the attackers. Now it is completely normal for the header to reveal multiple title keys, and it is much more difficult for the attacker to determine he is under forensic test. In this embodiment, it is useful for the title keys to have labels just like recording keys do, and for those labels to be encrypted by the recording keys in the header just like the title keys themselves are. It is also useful if the recording devices normally randomize the order of the encryptions in the content header. Otherwise, the attackers might be able to deduce they are in the forensic situation because of the absence of some systematic structure of the title keys in the header. Regarding the tracing traitors approach to determine which media key variant(s) the server has, all approaches described in the art are within the scope of this invention. Improved tracing approaches which trace "coalitions" rather than individuals may be used with the present invention.

In addition, in another embodiment of this invention, rather than using full-length keys in the recording table, it is possible, without reducing security, to store smaller-length values, and then cryptographically combine those values with the media key to produce a full-length key. For example, if the stored recording keys were 64-bits, and the media key was 128-bits, and the system was using 128-bit AES encryption, the device could expand the 64-bits by concatenating a 64-bit constant defined by the system, and then use the media key to decrypt the resulting value. This "decryption" would be suitably random, and could serve as the actual 128-bit recording key. Thus, the size of the recording key table can be reduced. All similar cryptographic combinations are within the scope of this invention.

As can be seen from the above disclosure, embodiments of the invention provide a broadcast encryption system that uses recording keys to facilitate traitor tracing. It will be appreciated that the present invention may be adapted to a variety of types of broadcast encryption systems including, for example, systems using either separate or unified media key block approaches.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
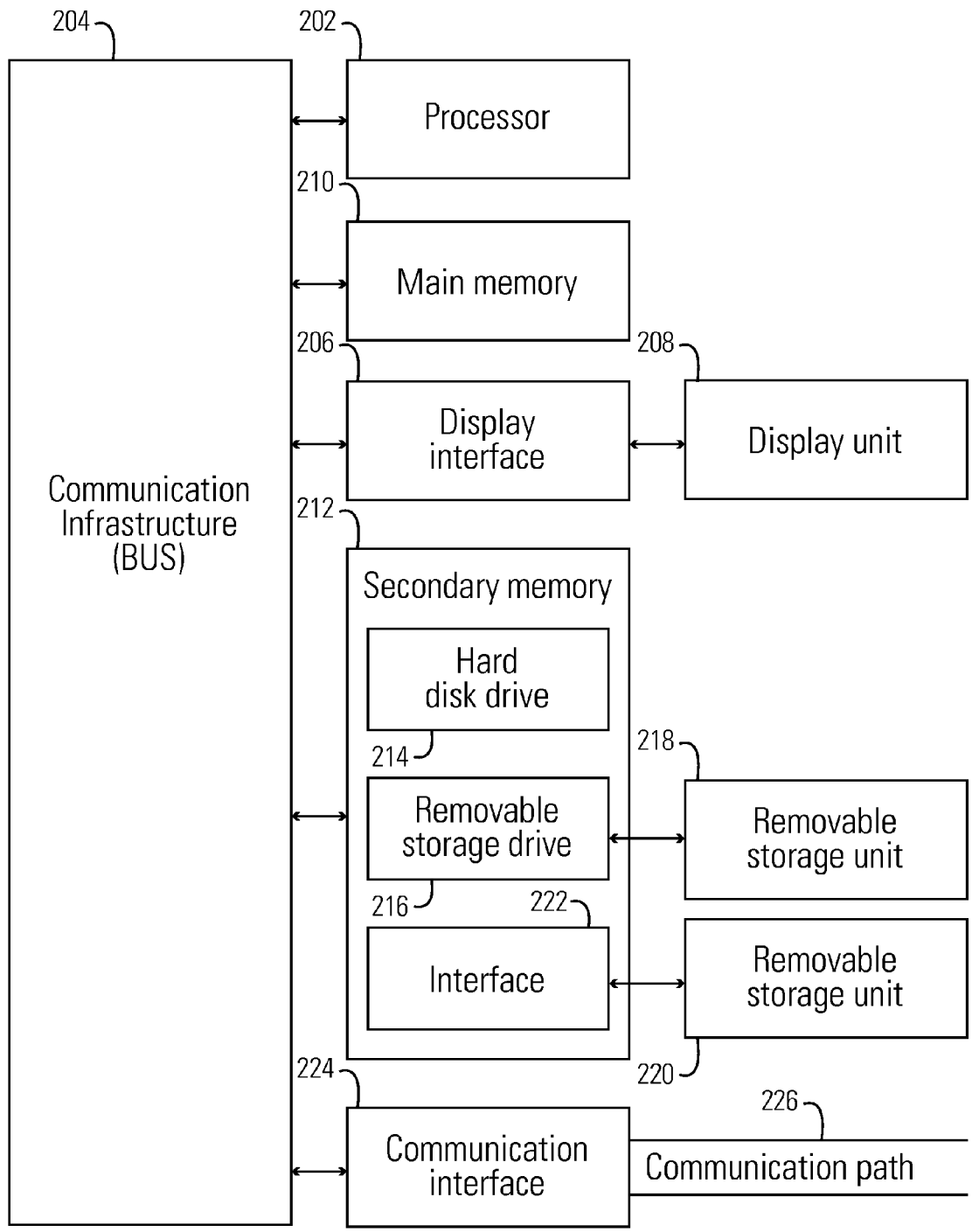
FIG. 6 is a high level block diagram of an information processing system useful for implementing one embodiment of the present invention.

FIG. 6 is a high level block diagram showing an information processing system useful for implementing one embodiment of the present invention. The computer system includes one or more processors, such as processor 202. The processor 202 is connected to a communication infrastructure 204 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 206 that forwards graphics, text, and other data from the communication infrastructure 204 (or from a frame buffer not shown) for display on a display unit 208. The computer system also includes a main memory 210, preferably random access memory (RAM), and may also include a secondary memory 212. The secondary memory 212 may include, for example, a hard disk drive 214 and/or a removable storage drive 216, representing, for example, a floppy disk drive, a magnetic tape drive, or an optical disk drive. The removable storage drive 116 reads from and/or writes to a removable storage unit 218 in a manner well known to those having ordinary skill in the art. Removable storage unit 218 represents, for example, a floppy disk, a compact disc, a magnetic tape, or an optical disk, etc. which is read by and written to by removable storage drive 216. As will be appreciated, the removable storage unit 218 includes a computer readable medium having stored therein computer software and/or data.

In alternative embodiments, the secondary memory 212 may include other similar means for allowing computer programs or other instructions to be loaded into the computer system. Such means may include, for example, a removable storage unit 220 and an interface 222. Examples of such means may include a program cartridge and cartridge interface (such as that found in video game devices), a removable memory chip (such as an EPROM, or PROM) and associated socket, and other removable storage units 220 and interfaces 222 which allow software and data to be transferred from the removable storage unit 220 to the computer system.

The computer system may also include a communications interface 224. Communications interface 224 allows software and data to be transferred between the computer system and external devices. Examples of communications interface 224 may include a modem, a network interface (such as an Ethernet card), a communications port, or a PCMCIA slot and card, etc. Software and data transferred via communications interface 224 are in the form of signals which may be, for example, electronic, electromagnetic, optical, or other signals capable of being received by communications interface 224. These signals are provided to communications interface 224 via a communications path (i.e., channel) 226. This communications path 226 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 210 and secondary memory 212, removable storage drive 216, and a hard disk installed in hard disk drive 214.

Computer programs (also called computer control logic) are stored in main memory 210 and/or secondary memory 212. Computer programs may also be received via communications interface 224. Such computer programs, when executed, enable the computer system to perform the features of the present invention as discussed herein. In particular, the computer programs, when executed, enable the processor 202 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of obtaining forensic information for an anonymous attack of digital content without variations in a broadcast encryption system, comprising:
    receiving, by a media device, digital content, a unified media key block, and a recording key table, said device including a processor and being configured to record digital content on recordable media;
    calculating, by said device, a set of recording keys from said recording key table using a media key variant from said unified media key block;
    generating, by said device, a title key;
    encrypting, by said device, said digital content with said generated title key;
    encrypting, by said device, said generated title key with each one of said calculated recording keys; and
    adding, by said device, a header including said encrypted title key to said encrypted digital content; and
    storing, by said device, said encrypted digital content with said header on recordable media.

2. The method of claim 1, wherein said table having rows of recording keys, each row corresponds to at least one device, and any two rows have at least one recording key in common.

3. The method of claim 1, further comprising:
    providing, by said device, a label for each recording key in said recording key table, said label enables a playback device to recognize said each recording key; and
    storing, by said device, said label in said header.

4. The method of 2, wherein said calculating a recording key table comprises calculating a table comprising an N out of M code.

5. The method of claim 1, further comprising:
    binding the recording keys to an identifier before encrypting said title key.

6. The method of claim 1, further comprising:
    transforming said title key based on usage rules associated with said digital content prior to encrypting said digital content.

7. A system of obtaining forensic information for an anonymous attack of digital content without variations in a broadcast encryption system, comprising:
    a recording device for generating and outputting a recording of digital content, said device including a processor in communication with a storage medium and a memory module, said processor executing a program that:
    obtains a media key variant from a unified media key block;
    calculates a set of recording keys from a recording key table and said media key variant,
    generates a single title key,
    encrypts said digital content with said generated title key,
    encrypts said title key with each of the set of recording keys,
    records said encrypted title key in a header of said encrypted content, and
    using said encrypted title key for identifying, to a content protection licensing agency, one or more device keys being used by a server for an anonymous attack of said digital content.

8. The system of claim 7, wherein said program calculates said set of recording keys by decrypting each recording key in a corresponding row of said recording key table.

9. The system of claim 8, wherein said recording key table is configured such that any two rows have at least one recording key in common.

10. The system of claim 7, wherein said program selects said generated title key randomly.

11. The system of claim 7, wherein said program further binds a recording key to an identifier.

12. The system of claim 7, wherein said program further transforms title key based on usage rules associated with said digital content.

13. A computer program product of obtaining forensic information for an anonymous attack of digital content without variations in a broadcast encryption system, said computer program product comprising a non-transitory computer usable medium having computer usable program code embodied therewith, said computer usable program code comprising computer usable program code configured to:
    receive digital content, a unified media key block, and a recording key table;
    calculate a set of recording keys from said recording key table using a media key variant calculated by said recording device from said unified media key block;
    generate a title key;
    encrypt said digital content with said generated title key;
    encrypt said generated title key with each one of said generated recording keys;
    add a header including said encrypted title key to said encrypted digital content; and
    store said encrypted digital content with said header on recordable media.

14. The computer program product of claim 13, wherein said computer usable program code is further configured to generate a recording key table having rows of recording keys, wherein each row corresponds to different recording devices, and wherein any two rows have at least on recording key in common.

15. A method of obtaining forensic information for an anonymous attack of digital content without variations in a broadcast encryption system, comprising:
    receiving, by a playback media device, encrypted digital content, said playback device including a processor and being configured to play digital content recorded on media;
    wherein a recording media device previously: (i) received digital content, a unified media key block, and a recording key table, (ii) calculated a set of recording keys from said recording key table by using a media key variant from said unified media key block, (iii) generated a title key, (iv) encrypted said digital content with said generated title key, and (v) encrypted said generated title key with each one of said generated recording keys;
    determining, by said playback device, which of said encrypted title keys said playback device can decrypt; and
    using said encrypted title key to decrypt said digital content.

* * * * *